United States Patent
Fackler et al.

(10) Patent No.: US 8,430,119 B2
(45) Date of Patent: Apr. 30, 2013

(54) WATER VALVE FOR ANIMAL WATERER PERMITTING ASSEMBLY WITHOUT TOOLS

(75) Inventors: Warren Fackler, Cedar Rapids, IA (US); Joseph Robinson, Cedar Rapids, IA (US)

(73) Assignee: Nelson Manufacturing Company, Cedar Rapids, IA (US)

( * ) Notice: Subject to any disclaimer, the term of this patent is extended or adjusted under 35 U.S.C. 154(b) by 353 days.

(21) Appl. No.: 12/770,104

(22) Filed: Apr. 29, 2010

(65) Prior Publication Data

US 2011/0265727 A1    Nov. 3, 2011

(51) Int. Cl.
*F16K 31/18*    (2006.01)

(52) U.S. Cl.
USPC .............. 137/437; 137/448; 119/78

(58) Field of Classification Search .......... 137/434, 137/409, 436, 437, 410, 448; 119/72, 75, 119/78, 79, 80; 251/360
See application file for complete search history.

(56) References Cited

U.S. PATENT DOCUMENTS

| | | | | |
|---|---|---|---|---|
| 691,569 A | * | 1/1902 | Pohlman | 251/360 |
| 969,874 A | * | 9/1910 | Jennings | 137/434 |
| 1,482,505 A | * | 2/1924 | Bergner | 137/448 |
| 2,309,043 A | * | 1/1943 | Breckheimer | 137/448 |
| 2,766,770 A | * | 10/1956 | Dickinson | 137/448 |
| 3,079,892 A | * | 3/1963 | Lowery | 119/79 |
| 3,120,240 A | * | 2/1964 | Kreuter | 137/448 |
| 3,139,897 A | * | 7/1964 | Morgan et al. | 137/448 |
| 3,405,687 A | * | 10/1968 | Ruter | 137/448 |
| 3,406,711 A | * | 10/1968 | Fogg | 137/443 |
| 4,274,365 A | * | 6/1981 | Peters | 137/426 |
| 4,708,830 A | * | 11/1987 | Shepherd et al. | 137/446 |
| 4,901,753 A | * | 2/1990 | Barker | 137/436 |

OTHER PUBLICATIONS

Owner's Manual Models 1200 & 1200A Automatic Waterer, Jul. 2003, Nelson Manufacturing Company, Cedar Rapids, Iowa.

* cited by examiner

*Primary Examiner* — Craig Schneider
*Assistant Examiner* — Craig J Price
(74) *Attorney, Agent, or Firm* — Allan L. Harms; Shuttleworth & Ingersoll, PLC (57) ABSTRACT

A water valve for an animal waterer which can be assembled, disassembled and repaired without the use of tools. The float arm pivots upon the valve body about an integral trunnion bar to permit selective engagement of the valve seal with the valve seat. A cover member overlies the valve body and retains the float arm to the valve body.

19 Claims, 7 Drawing Sheets

WATER VALVE FOR ANIMAL WATERER PERMITTING ASSEMBLY WITHOUT TOOLS

BACKGROUND

Animal waterers have developed over the years to automatically dispense a liquid into a container. Typically, the container is a vessel connected to a water source which can be selectively activated to fill the vessel with the liquid while also being selectively deactivated so that the vessel does not overflow.

In order to activate and deactivate the water source, a traditional animal waterer utilizes a float valve. The float valve includes a float, a float arm, and a valve body. The float lies on the surface of the liquid and can be raised or lowered by the level of the liquid in the vessel. As more liquid is added to the vessel, the float rises and manipulates the float arm to close the valve and not allow additional liquid to enter the vessel. As the liquid leaves the vessel such as by an animal consuming the water, or by evaporation or spillage, the float eventually lowers a sufficient amount such that the valve is re-opened. Liquid is allowed to flow and the vessel is filled with the liquid until the valve is closed again.

The float valve of a standard animal waterer is exposed to potential maltreatment by the animal as well as exposure to weather. These outside forces, along with normal wear and tear, leave the parts of the float valve susceptible to damage and the parts must frequently be replaced. The typical float valve of an animal waterer utilizes fasteners such as cotter pins or screws to secure the float and float arm to the valve body. In addition to requiring extra parts, replacing the parts of the valve body is time consuming and requires tools to remove fasteners such as cotter pins or screws. Since some users of animal waterers may possess many individual waterers, the number of parts and time needed to repair damaged waterers due to a worn or malfunctioning valve seal can be significant. A float valve assembly which may be disassembled without tools would expedite replacement of valve parts.

SUMMARY OF THE INVENTION

The present invention is a float valve for an animal waterer, especially a waterer for small animals such as dogs, which contains a float, a float arm, valve body including a valve seat, and a cover. The float valve allows a water source to fill a container with water. As the water level in the container rises, the float also rises which raises the arm causing a valve seal on the arm to pivot into engagement with the valve seat. As water level in the container drops, the arm eventually lowers to a position at which the valve seal separates from the valve seat and this opens the valve and allows water to enter the container. The parts may all be manipulated and replaced by hand. Therefore, the need for additional tools and excess parts is eliminated.

In the preferred embodiment, the float is selectively attachable to one end of the float arm. The other end of the arm contains the valve seal and a pair of trunnions. The float body includes a valve body in the form of a shell which has an open bottom. The valve body includes opposing sidewalls, each with a recess formed along the lower edge of the sidewall. The two opposing recesses receive the trunnions when the valve is assembled. The valve body also contains an end wall with an inner face having a valve seat and an outer face with a coupling which is attachable to a water source. The valve seat and the coupling have communicating passageways such that water can enter the coupling and exit the opening of the valve seat.

The invention also includes a cover which slides over the valve body. The valve body includes external bosses such that openings in the cover will capture the bosses and lock the cover in place over the valve body while simple hand manipulation of the device can unlock the cover from the valve body. The cover also includes a flange extending inwardly from each sidewall of the cover. The flanges slide over the bottom of the valve body and retain the trunnions within the recesses. Although the trunnions are contained within the recesses, the trunnions may still freely rotate in the recesses which allows the arm to pivot between a first position to a second position.

The invention is secured to a container capable of holding water and connected to a water source. With the seal separated from the valve seat, water enters the coupling on the outer wall and exits the valve seat opening into the container. As the water level rises in the container, eventually the water will raise the float. The float rises with the level of the water causing the arm to pivot on the valve body to a position in which the seal touches the valve seal and stops the flow of water.

The valve seal is a small elastomeric element which can be removed from a cylindrical recess in the float arm when replacement is needed.

It is therefore an object of the present invention to provide an animal waterer float valve assembly which does not require any tools to be assembled or disassembled.

It is further an object of the present invention to provide a float valve for an animal waterer which does not require fasteners such as cotter pins to retain the valve body to the float and float arm.

It is another object of the present invention to provide an animal waterer with a cover that protects the valve seal and valve seat.

It is yet another object to provide a water valve for an animal waterer having all components except the valve seal formed of a single polymer compound.

DETAILED DESCRIPTION

This disclosure pertains to float valves for animal waterers and in particular to float valves for dog waterers which are mounted to a vertical wall or to a pole.

Figure 1:
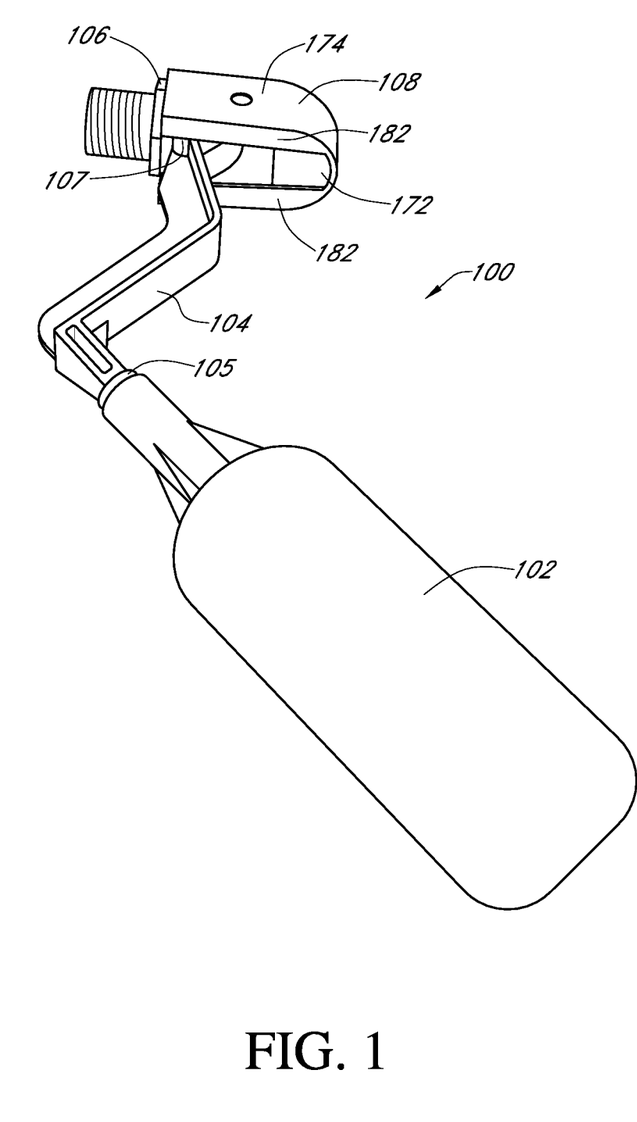
FIG. 1 is a perspective view of the invention.

FIG. 1 shows the preferred embodiment of a water valve 100 as assembled and comprises a float 102, an arm 104, a valve body 106 and a cover 108. The float 102 is connected to a first end 105 of the arm 104. A second end 107 of the arm 104 is hinged to the valve body 106 and retained thereto by the cover 108.

Figure 2:
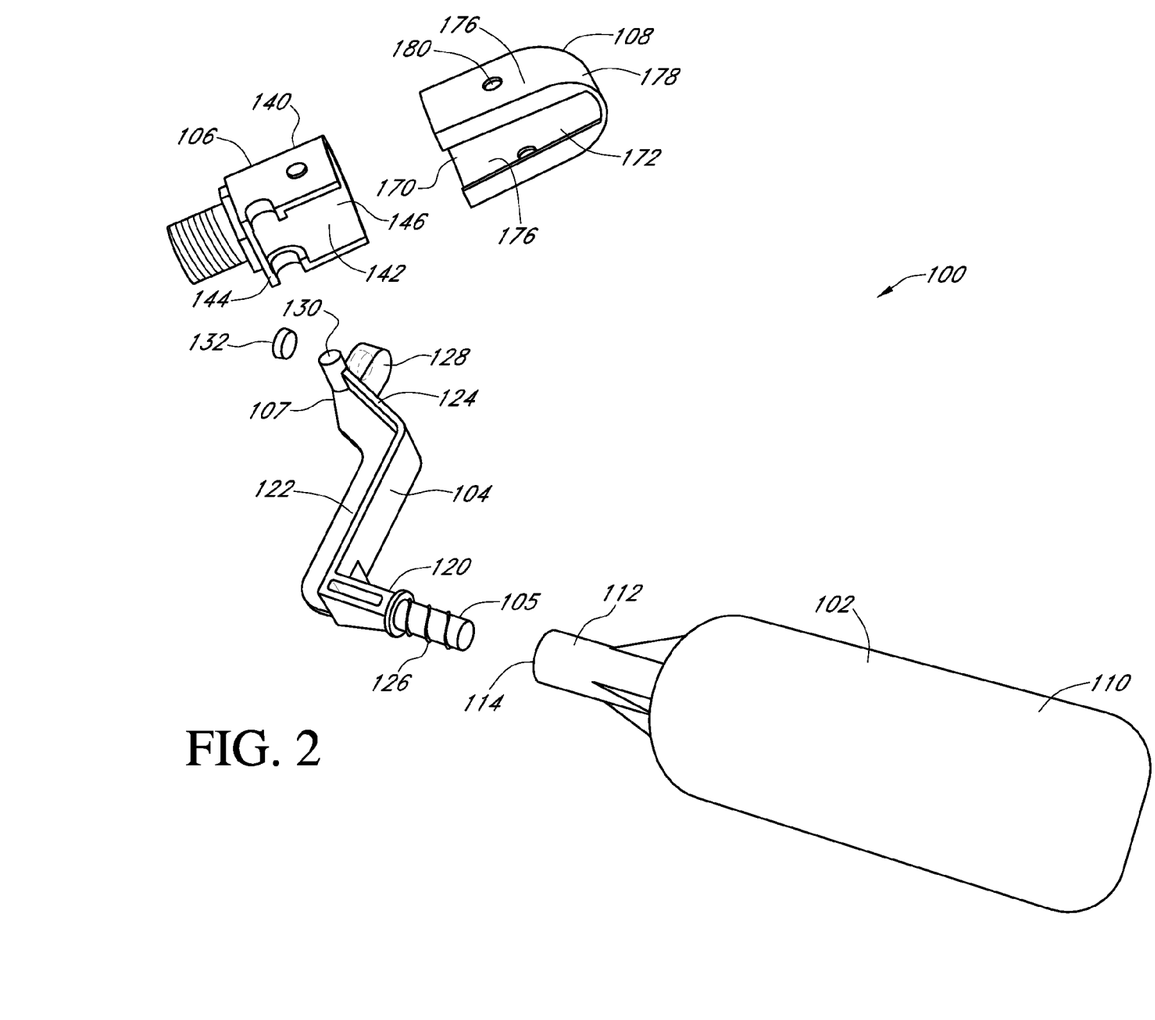
FIG. 2 is an exploded view of the invention.

FIG. 2 shows an exploded perspective view of the water valve 100. The float 102 includes a buoyant portion 110 which can be constructed in a variety of shapes but which is preferably primarily cylindrical. Buoyant portion 110 is preferably a hollow air-filled enclosure. A connecting member 112 extends from the buoyant portion 110 and allows the float 102 to be connected to the arm 104. Preferably the connecting member 112 includes an internally threaded cylindrical bore 114 which may receive the first end 105 of arm 104. Because all parts of the valve 100 may be constructed of polymers, the threads within connecting member 112 and on first end 105 may be at a very coarse pitch.

Figure 3:
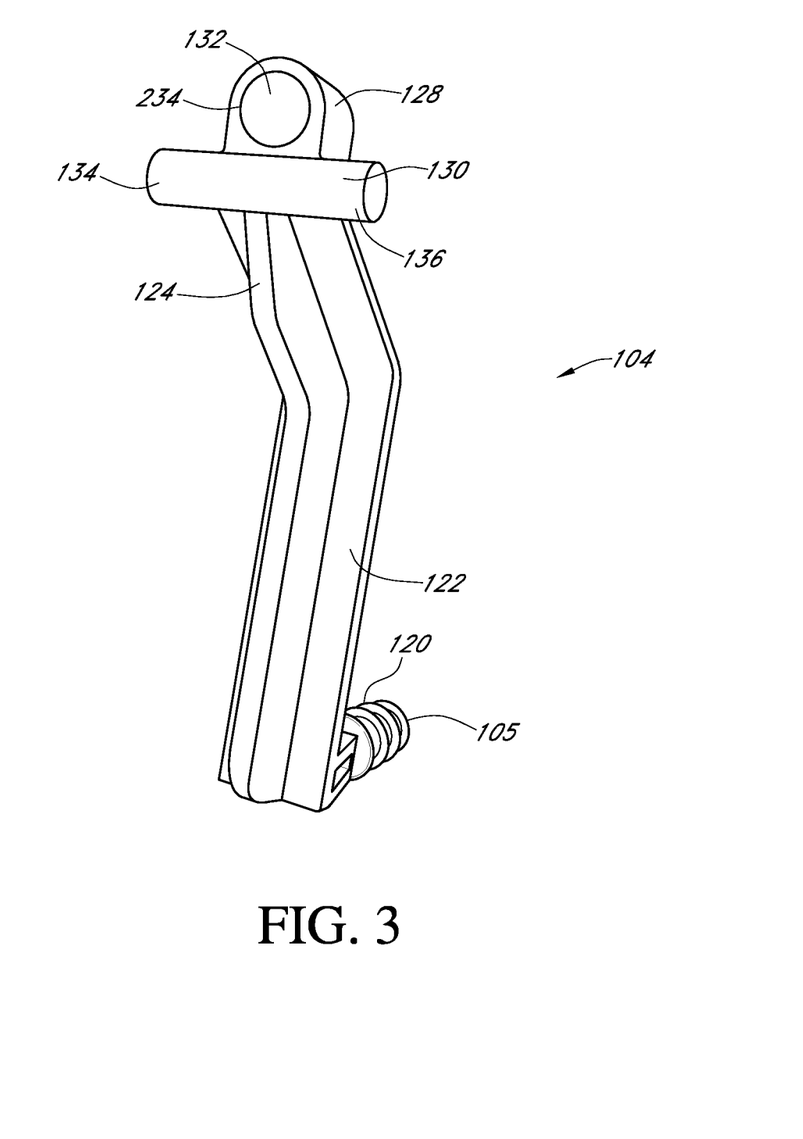
FIG. 3 is a perspective view of the arm of the invention.

FIGS. 2 and 3 show the preferred embodiment of the arm 104 which comprises a first segment 120, a second segment 122, and a third segment 124 although other embodiments are possible with more or fewer segments. The first segment 120 includes a first end 105 which is provided with external threads 126 therealong which are complementary to the threads in bore 114 of the float 102. The float 102 therefore can be joined to the first segment 120 such that the first segment 120 is coaxial with the longitudinal axis of the float 102. The second segment 122 of arm 104 is joined to the first segment 120 preferably at a substantial perpendicular. The third segment 124 is joined to the second segment 122 at an angle between zero and ninety degrees, preferably about fifty to sixty degrees and most preferably fifty-seven degrees. The third segment 124 includes a transverse trunnion bar 130 and a valve seal mount 128 into which valve seal 132 is preferably removably mounted. The trunnion bar 130 is preferably cylindrical and includes ends 134, 136 which extend from each side of arm 104 at a substantial perpendicular to the longitudinal axis of the third segment 124 of arm 104. Trunnion bar 130 is located adjacent to second end 107 of arm 104, immediately adjacent to valve seal mount 128.

It may be observed in FIG. 2 that valve seal 132 is a short resilient solid of round cross section made from resilient material such as synthetic rubber. Valve seal 132 is received in a cylindrical recess 234 of valve seal mount 128. Though preferably removable from recess 234, valve seal 132 may be permanently secured within recess 234. Valve seal mount 128 extends from third segment 124 of arm 104 at approximately fifty to sixty degrees such that valve seal mount 128 is substantially parallel to second segment 122 of arm 104.

Figure 4:
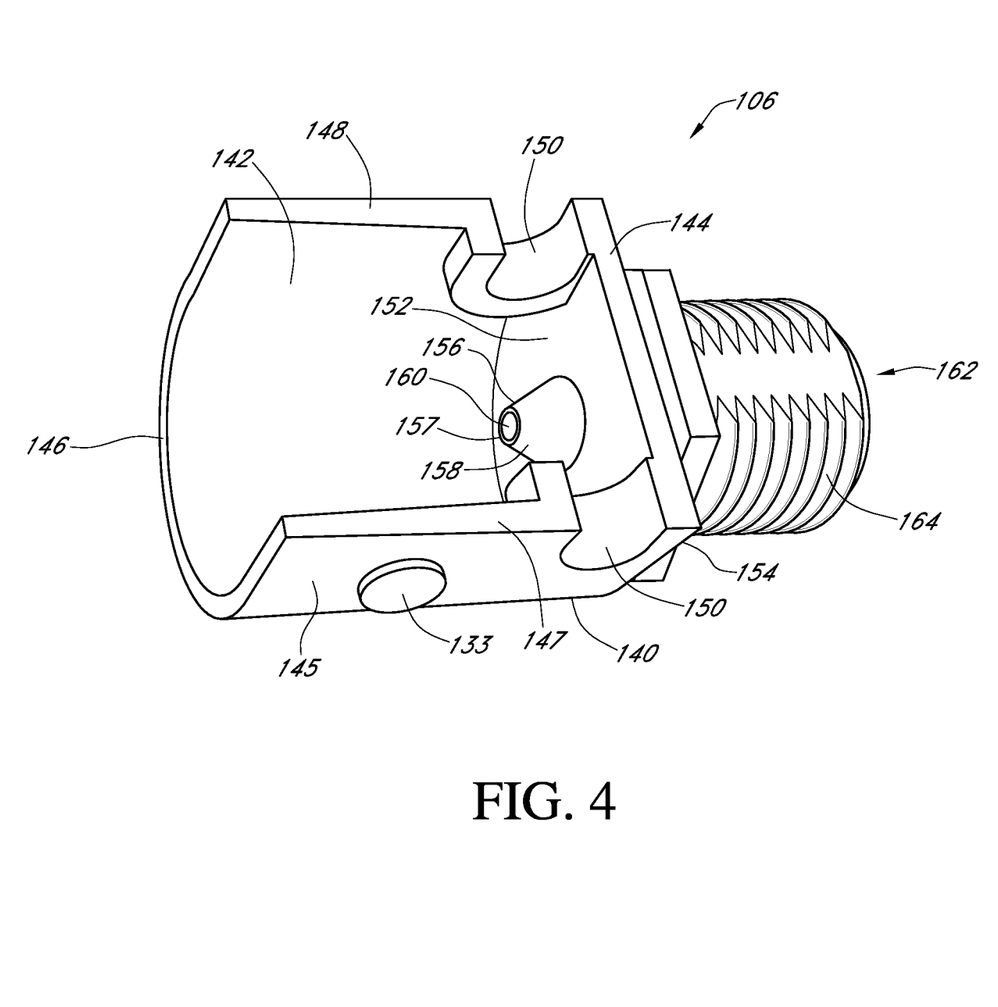
FIG. 4 is a bottom view of the valve body of the invention.

The valve body 106 is also seen in FIG. 2 and an enlarged view thereof is shown in FIG. 4. Valve body 106 comprises an upper region 140, an open bottom 142, and a first end wall 144. The upper region 140 includes a U-shaped sidewall 146 with free edges 147, 148 which define open bottom 142. Edges 147, 148 each include a recess 150 adjacent to first end wall 144. The recesses 150 are formed, preferably semi-cylindrically, to accommodate the ends 134, 136 of trunnion bar 130 of the arm 104. The recess 150 on each edge 147, 148 is preferably located immediately adjacent first end wall 144. Additionally, sidewall 146 includes diametrically opposing bosses 133 protruding from the outer surface 145 of the sidewall 146.

The first end wall 144 comprises an inner face 152 and an outer face 154. The inner face 152 includes an integrally formed valve seat member 156. The valve seat member 156 extends from the inner face 152 and comprises a frusto-conical sidewall 158 which ends in an opening 160. Frusto-conical sidewall 158 may be substituted by an elongate cylinder or other shape which supports valve seat 157 at the free end thereof. Valve seat member 156 may alternatively be made selectively removable from inner face 152.

The outer face 154 of first end wall 144 includes a coupler 164 with a bore 162 therethrough which is in communication with the first opening 160 of valve seat member 156. Coupler 164 is preferably formed integrally with end wall 144. The coupler 164 is preferably externally threaded as well as internally threaded and can attach to a water line or an adapter for a common garden hose.

Preferably all portions of valve body 106 are integrally formed of the same polymer in the same molding operation. Particularly, polyacetal may be used to form the individual members of the valve 100 by injection molding techniques, with the exception of the valve seal 132 which is an elastomer. Float 102 may be fabricated from a suitable material other than polyacetal. The polyacetal used for the rigid members of the valve 100 provides rigidity, low friction and dimensional stability for the valve body 106, the cover 108, the arm 104 and the float 102.

FIG. 1 shows the cover 108 in place overlying the valve body 106, while FIG. 2 shows the cover 108 from a perspective view. The cover 108 comprises a curved upper region 174 which preferably conforms to the shape of upper region 140 of the valve body 106 such that cover 108 may overlie and surround sidewall 146 of valve body 106. The cover 108 has an open front 170 and a substantially open bottom 172. Upper region 174 comprises opposing side walls 176 and a back wall 178. Each side wall 176 includes an opening 180 which is positioned and sized to receive one of opposing bosses 133 of the valve body 106. The cover 108 further comprises flanges 182 extending from each sidewall 176 at a substantial perpendicular. Free edges 147, 148 of flanges 182 are spaced apart, defining open bottom 172. (See FIG. 6C).

Figure 5:
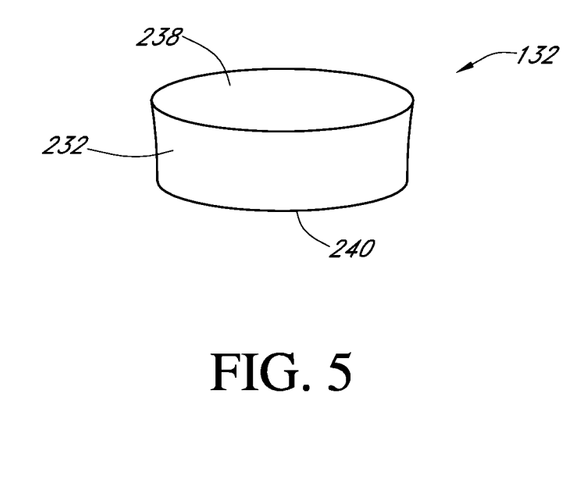
FIG. 5 is a greatly enlarged perspective of the valve seal of the invention.

In FIG. 5 it can be seen that valve seal 132 comprises sealing surface 238 and a planar base surface 240. Sealing surface 238 is very slightly domed while the sidewall 232 of valve 132 is slightly concave. The diameter of sealing surface 238 slightly exceeds the diameter of recess 234 into which valve seal 132 is received, while base surface 240 is substantially equal in diameter to the diameter of cylindrical recess 234. Valve seal 132 is of round cross section from base surface 240 to sealing surface 238.

Figure 6A:
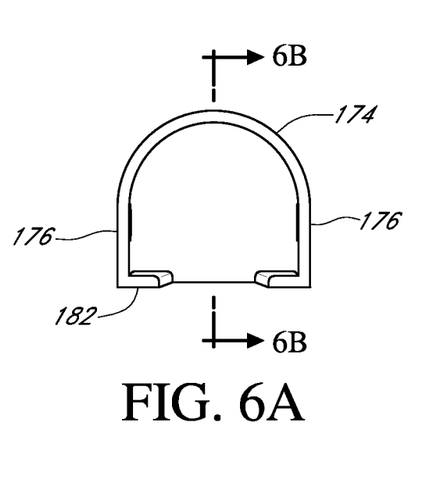
FIG. 6A is an enlarged end view of the cover of the invention.
Figure 6B:
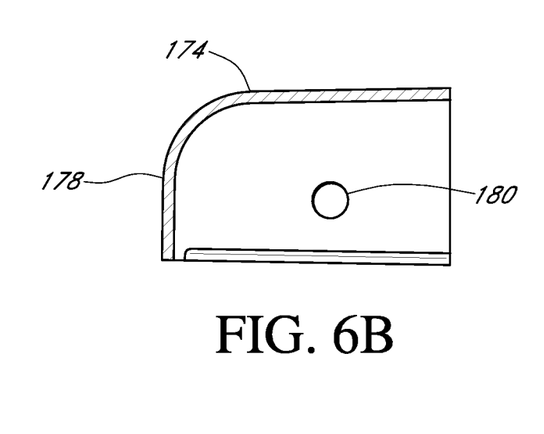
FIG. 6B is an enlarged cross section of the cover of the invention taken along line 6B-6B of FIG. 6A.
Figure 6C:
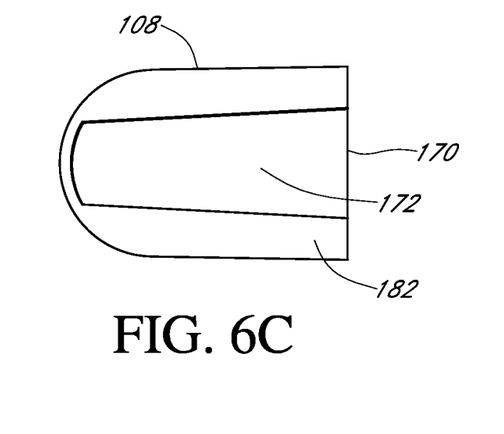
FIG. 6C is an enlarged bottom view of the cover of the invention.

Details of cover 108 may be observed in FIGS. 6A, 6B, and 6C. FIG. 6A provides an end view of the cover 108, cover 108 including curved upper region 174 which interconnects opposing generally parallel sidewalls 176. At the lower end of each sidewall 176 is a flange 182 which extends toward the center of cover 108. As can be observed in FIG. 6A, cover 108 is slightly tapered from its open end 170 to its back wall 178 such that open front 170 is very slightly wider than the spacing of sidewalls 176 as they move away from open front 170 toward back wall 178.

The cross section view of FIG. 6B illustrates that sidewall openings 180 are located such that the bosses 133 of valve body 106 will enter sidewall openings 180 when cover 108 is snapped onto valve body 106.

In FIG. 6C it can be seen that flanges 182 extend from sidewalls 176 and are slightly narrower near open front 170 than further therefrom. Flanges 182 define open bottom 172 which narrows slightly from open front 170 toward back wall 178.

Again referring to FIG. 1 and FIG. 2, the preferred method for assembling the valve 100 starts with threading the arm 104 into the float 102. Next, seal 132 is inserted into recess 234 of arm 104 and arm assembly is positioned such that each end 134, 136 of trunnion bar 130 of the arm 104 sits within one of recesses 150 of the valve body 106. The correct configuration allows the valve seal 132 to selectively engage the valve seat 157 of the valve body 106 as the trunnion bar 130 rotates in the recesses 150. Finally, the cover 108 slides over the valve body 106 such that flanges 182 overlie the open ends of the recesses 150 and therefore retain ends 134, 136 of the trunnion bar 130 within recesses 150. The openings 180 of the cover 108 also receive the bosses 133 to retain the valve body 106 within the cover 108. Simple hand removal of the cover from the valve body 106 allows disassembly of the valve 100 such that replacement of the valve seal 132 may be accomplished.

As an alternative, the recesses 150 of valve body 106 may be formed with a narrowing of the opening into each recess 150 such that ends 134, 136 of trunnion bar 130 may be snapped past the narrowed opening into the recess, such that the ends 134, 136 will not fall from recesses 150 without some force being applied in a downward direction, thereby obviating the need for flanges 182 to capture ends 134, 136 within recesses 150.

Figure 7:
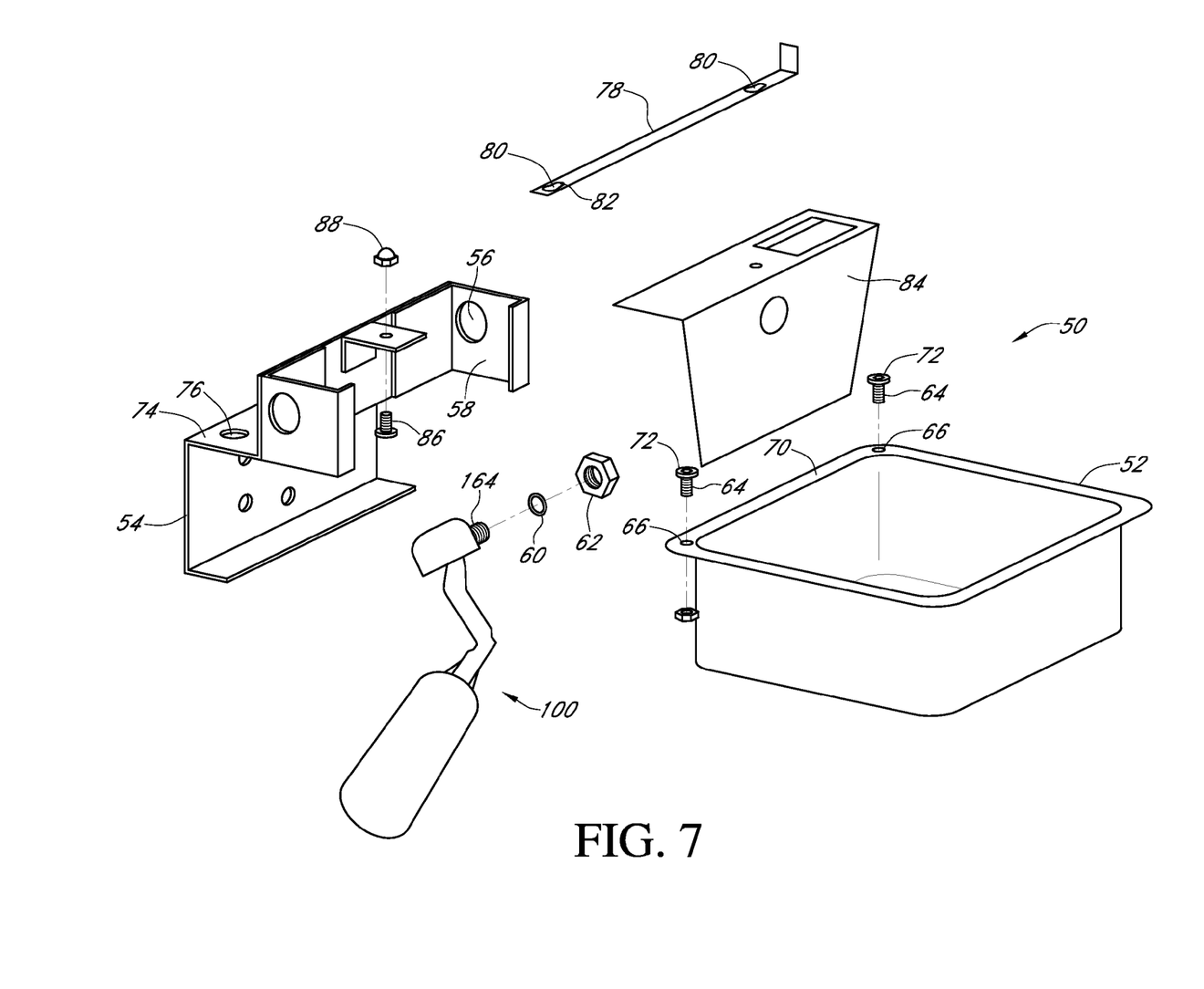
FIG. 7 is an exploded perspective of a small animal watering apparatus equipped with the float valve invention.

In FIG. 7, a small animal waterer 50 equipped with water valve 100 is shown in an exploded view. Waterer 50 comprises a bowl 52 for holding water. Bowl 52 is supported by wall bracket 54 which may be fastened to an upright wall. Alternatively, using suitable adapters, bracket 54 may be mounted to an upright pole such as a support port for a chain link fence. Water valve 100 is mounted to wall bracket 54 by inserting water line coupler 164 through opening 56 of bracket sidewall 58 and retaining valve 100 to sidewall 58 by washer 60 and nut 62. To efficiently assemble dog waterer 50, after arm 104 is threaded into float 102, valve body 106 is secured to wall bracket 54 and then arm 104 is positioned on valve body 106 such that each end 134, 136 of trunnion bar 130 sits within a recess 150. Then cover 108 is slid onto valve body 106.

Latch bolts 64 are inserted part way into threaded openings 66 of adjacent corners of bowl 52 such that a gap remains between top surface 70 and heads 72 of bolts 64. Bowl 52 is then located below horizontal plate of 74 of bracket 54 with bolts 64 protruding through holes 76. Latch bar 78 is then located above housing plate 74 such that slotted holes 80 receive the heads 72 of bolts 64 and the latch bar 78 is then slid longitudinally so that the narrows 82 of slotted holes 80 capture heads 72 and prevent them from falling through holes 76. With the bowl 52 thus secured to bracket 54, valve cover 84 may be installed over valve 100 to shield valve 100 from manipulation by an animal, e.g., a dog, drinking from bowl 52. Screw 86 and cap nut 88 are used to secure valve cover 84 to bracket 54. A water source may then be coupled to coupler 164 of valve 100 such that water may fill bowl 52 to a desired level as controlled by float valve 100.

Having thus described the invention in connection with the preferred embodiment thereof, it will be evident to those skilled in the art that various revisions can be made to the embodiments described herein without departing from the spirit and scope of the invention. It is intended that all such revisions and modifications that are evident to those skilled in the art will be included within the scope of the following claims. Any elements of any embodiment disclosed herein can be used in combination with any elements of other embodiments disclosed herein in any manner to create different embodiments.

What is claimed is:

1. A float valve for an animal waterer comprising
a float element,
an elongate arm including a first end joined to the float element,
the arm including a valve seal upon a second end thereof,
a valve body comprising opposing sidewalls joined to an end wall,
each sidewall including a free edge,
a valve seat disposed upon an inner face of the end wall,
the valve seat including an opening therein,
the valve seal touchingly engageable with the valve seat,
the arm selectively pivotable upon the valve body between a first position wherein the valve seal is touchingly engaged with the valve seat and a second position wherein the valve seal is disengaged from the valve seat,
the free edge of each sidewall of the valve body including a curved recess therealong,
the curved recesses including open ends,
the arm including a trunnion bar adjacent the second end thereof,
the trunnion bar substantially perpendicular to an axis of the arm,
the trunnion bar including opposing ends extending from the arm on opposing sides thereof,
the ends of the trunnion bar selectively receivable within the curved recesses of the free edges of the valve body,
the ends of the trunnion bar freely removable from the curved recesses through the open ends thereof,
the ends of the trunnion bar freely rotatable within the recesses,
the ends of the trunnion bar selectively retained to the valve body by a cover member,
an outer face of the end wall of the valve body including a water line coupler,
the water line coupler including a bore therethrough, the bore communicative with the opening of the valve seat.

2. The water valve of claim 1 wherein
the valve seat is integrally formed on the end wall of the valve body,
the water line coupler is integrally formed on the end wall of the valve body.

3. The water valve of claim 2 wherein
the valve seat is frusto-conical in shape and extends from the end wall of the valve body.

4. The water valve of claim 1 wherein
the arm is nonlinear.

5. The water valve of claim 1 wherein
the arm comprises a first segment selectively joined to the float element,
a second segment joined substantially perpendicularly to the first segment,
the second segment joined to a third segment,
the valve seal retained to the third segment adjacent the trunnion bar.

6. The water valve of claim 1 wherein
the valve body further comprises a curved portion joining the opposing sidewalls,
the curved portion joined to the end wall of the valve body.

7. The water valve of claim 6 wherein
the cover substantially conforms to the curved portion and sidewalls of the valve body,
the cover including inwardly depending flanges on lower ends of sidewalls of the cover,
the flanges underlying the recesses in the sidewalls of the valve body when the cover is placed upon the valve body.

8. The water valve of claim 1 wherein
the elongate arm is removably connected to the float element,
the arm including a first segment coaxial with a longitudinal axis of the float element, the first segment of the arm joined to a second segment substantially perpendicular to the first segment,
the second segment of the arm joined at between 0° and 90° to a third segment,
the third segment of the arm including the valve seal,
the valve body further comprising a curved upper region and an open bottom,
the curved upper region joining the sidewalls of the valve body,
the valve seat integrally formed on the first end wall,
at least one boss protruding from an outer face of at least one of the opposing sidewalls of the valve body,
the valve seat comprising a frusto-conical element terminating in an opening,
the cover having an open first end,
the cover including at least one opening into which the at least one boss may be received.

9. The water valve of claim 8 wherein
the valve body and the arm are formed of polyacetal.

10. The water valve of claim 8 wherein
the third segment of the arm comprises a seal mount,
the seal mount comprising a recess into which the valve seal is received,
the valve seal selectively removable from the recess of the seal mount on the arm,
the seal mount immediately adjacent the trunnion bar.

11. The water valve of claim 10 wherein the valve seal is manually removable from the recess of the seal mount.

12. The water valve of claim 8 wherein
the valve seal is formed of an elastomer.

13. The water valve of claim 1 wherein
the valve seat is a frusto-conical element terminating in an opening.

14. The water valve of claim 1 wherein
the valve seat is a frusto-conical element terminating in an opening,
the frusto-conical element is integrally formed with the end wall of the valve body.

15. A float valve for an animal waterer comprising
a float element,
an elongate arm including a first end joined to the float element,
the arm including a valve seal upon a second end thereof,
a valve body comprising opposing sidewalls joined to an end wall,
each sidewall including a free edge,
a valve seat disposed upon an inner face of the end wall,
the valve seat including an opening therein,
the valve seal touchingly engageable with the valve seat,
the arm selectively pivotable upon the valve body between a first position wherein the valve seal is touchingly engaged with the valve seat and a second position wherein the valve seal is disengaged from the valve seat,
the free edge of each sidewall of the valve body including a curved recess therein,
the arm including a trunnion bar adjacent the second end thereof,
the trunnion bar substantially perpendicular to an axis of the arm,
the trunnion bar including opposing ends extending from the arm on opposing sides thereof,
the ends of the trunnion bar selectively receivable within the recesses of the valve body,
the ends of the trunnion bar freely rotatable within the recesses,
the ends of the trunnion bar removably retained to the valve body,
an outer face of the end wall of the valve body including a water line coupler,
the water line coupler including a bore therethrough, the bore communicative with the opening of the valve seat,
at least one of the opposing sidewalls of the valve body includes a first locking element,
a cover selectively overlying the valve body,
the cover including at least one second locking element,
the at least one second locking element selectively touchingly engageable with the at least one first locking element,
the second locking element resisting removal of the cover from the valve body.

16. The water valve of claim 15 wherein
each of the opposing sidewalls of the valve body includes a first locking element,
the cover selectively overlying the valve body,
the cover including opposing second locking elements,
each of the second locking elements touchingly engaging a one of the first locking elements when the cover overlies the valve body.

17. The water valve of claim 16 wherein
each first locking element is a protrusion on an exterior of each sidewall of the valve body,
each second locking element is an opening through a sidewall of the cover,
each of the second locking elements receives a one of the protrusions of the valve body when the cover is placed over the valve body and retains the trunnions to the sidewalls of the valve body.

18. The water valve of claim 16 wherein
a one of the first locking elements and the second locking elements is a boss,
an other of the first locking elements and the second locking elements is an opening,
each boss is received in one of the openings when the cover is disposed over the valve body.

19. A float valve for an animal waterer comprising
a valve body comprising opposing sidewalls joined to an end wall,
each sidewall including a free edge,
a valve seat disposed upon an inner face of the end wall,
the valve seat including an opening therein,
an elongate arm including a first end joined to a float element,
the arm including a valve seal upon a second end thereof,
the valve seal touchingly engageable with the valve seat,
the arm pivotable upon the valve body from a first position wherein the valve seal is touchingly engaged with the valve seat to at least a second position wherein the valve seal is disengaged from the valve seat,
each sidewall of the valve body including a curved recess therein,
the arm including a trunnion bar adjacent the second end thereof,
the trunnion bar substantially perpendicular to an axis of the arm,
the trunnion bar including opposing ends extending from the arm on opposing sides thereof,
the ends of the trunnion bar selectively receivable within the curved recesses of the sidewalls of the valve body,
the arm pivotable about an axis of the trunnion bar,
the ends of the trunnion bar removably retained to the valve body,
an outer face of the end wall of the valve body including a water line coupler, the water line coupler including a bore therethrough, the bore communicative with the opening of the valve seat,
at least one of the opposing sidewalls of the valve body includes a first locking element,
a cover selectively overlying the valve body,
the cover including at least one second locking element,
the at least one second locking element selectively touchingly engageable with the at least one first locking element,
the second locking element resisting removal of the cover from the valve body.

* * * * *